O. F. KEITH.
BRACELET LINK.
APPLICATION FILED JULY 19, 1913.
1,098,505.
Patented June 2, 1914.
Fig. 1.
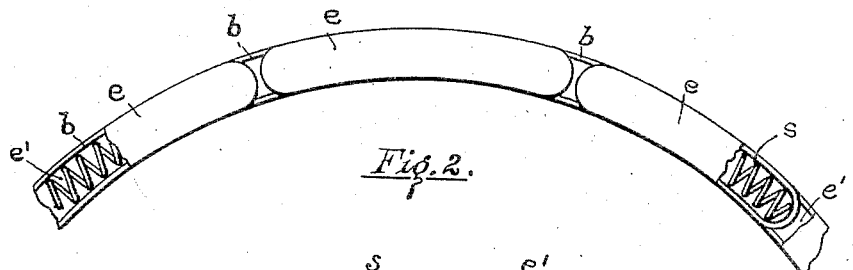
Fig. 2.
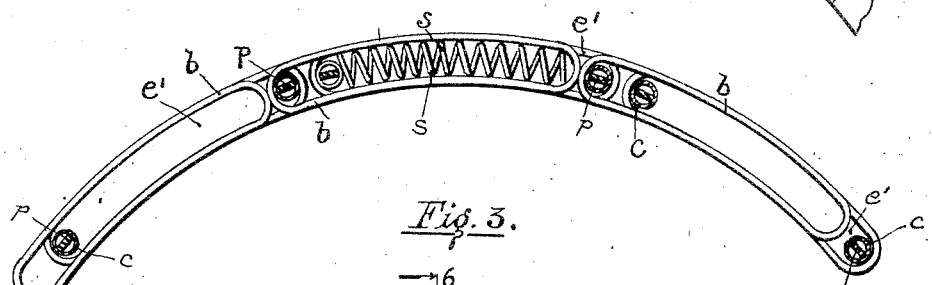
Fig. 3.
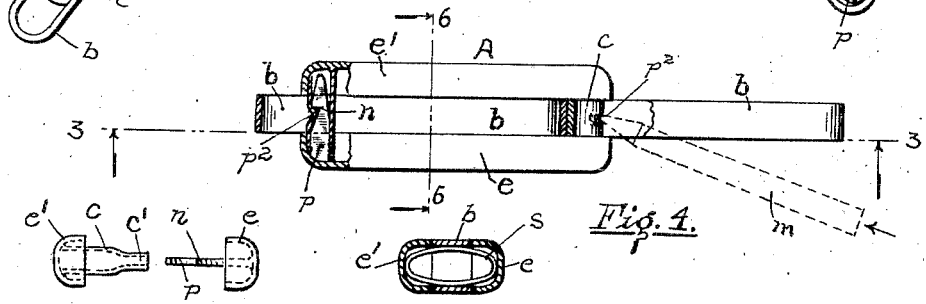
Fig. 4.
Fig. 5.   Fig. 6.
WITNESSES.
Calvin H. Brown
Charles C. Remington
INVENTOR.
Ozro F. Keith.
BY Geo. H. Remington,
ATTY.

UNITED STATES PATENT OFFICE.

OZRO F. KEITH, OF PROVIDENCE, RHODE ISLAND, ASSIGNOR TO JOHN T. MAURAN MANUFACTURING COMPANY, OF PROVIDENCE, RHODE ISLAND, A CORPORATION OF RHODE ISLAND.

BRACELET-LINK.

1,098,505. Specification of Letters Patent. Patented June 2, 1914.

Original application filed May 21, 1913, Serial No. 768,937. Divided and this application filed July 19, 1913. Serial No. 779,908.

*To all whom it may concern:*

Be it known that I, OZRO F. KEITH, a citizen of the United States, residing at Providence, in the county of Providence and State of Rhode Island, have invented certain new and useful Improvements in Bracelet-Links, of which the following is a specification.

In a co-pending application for patent, of which this is a division, filed by me in the United States Patent Office, May 21, 1913, Serial Number 768,937, I have shown and described certain improvements in flexible bracelets.

My present application for patent also relates to link bracelets, and more particularly to novel means for connecting the lateral side members of each link unit together. That is to say, in certain types of flexible bracelets, each main link thereof consists of a pair of laterally separated, oppositely disposed side members, rigidly connected together at the ends thereof by soldering. The employment of solder for such purpose, especially if hard solder be used, materially increases the cost of manufacture owing to the fact that the heat applied in fusing the solder acts to discolor and otherwise impair the stock at such soldered places, thus necessarily requiring a re-finishing process. If low-fusing or "soft" solder be used for connecting the said members of the link, the thus-soldered joint is much more liable to become unsoldered or broken while the bracelet is in normal use.

The object I have in view is to mechanically connect the members of the link without the use of solder, thereby materially lessening the cost of manufacture, the strength of the corresponding joint being practically equal to that united by hard solder.

In the accompanying sheet of drawings, Figure 1 is a face view of a flexible bracelet provided with main links embodying my invention; Fig. 2 is a side elevation in enlarged scale; portions of some of the links being broken away; Fig. 3 is a side elevation, in partial section, taken substantially on line 3—3 of Fig. 4, one of the springs being represented; Fig. 4 is a top plan view, in partial section, showing one of the main links constructed according to my improvement, and also showing the adjacent coupling links, the springs being omitted; Fig. 5 is an end elevation of the two side members before being connected together; and Fig. 6 is a cross-section, taken on line 6—6 of Fig. 4.

My improved main link unit A (see Fig. 4) consists of curved elongated, inwardly facing laterally spaced front and back side members $e$, $e^1$, respectively, each member having U-shaped form cross-sectionally, and terminating in well-rounded ends. The said side members may be swaged or die-shaped from suitable sheet metal stock; the latter may consist wholly or in part of precious metal.

To the respective ends of the inner face of each of the side members $e^1$ of the links A is permanently secured, at right angles to said face, a short hollow post $c$. The inner faces of the opposed side members $e$ of the links are provided with rigidly fixed bar or pin members $p$ arranged to register with and enter the open outer ends of the respective tubes or hollow posts $c$ in a telescopic manner. The outer edge of the free end portion of each bar $p$ is provided with a notch $n$ into which the wall of the tube may be readily depressed, or indented, at $p^2$, by a suitable tool, as for example by a prick-punch $m$, shown dotted in Fig. 4.

It may be stated that the members $e$, $e^1$, of the link A are spaced apart laterally a fixed distance equal to the width of the interposed coupling links $b$, at the same time allowing sufficient play or clearance to insure flexibility of movement. The said lateral distance may be determined by the length of the tubes $c$; that is, the parts are constructed so that when the free ends of the tube snugly engage the inner face of the opposed pin-carrying side member $e$, the lateral distance between the members $e$, $e^1$ slightly exceeds the width of the coupling $b$, substantially as stated. Prior to thus securing the side members of the main links A together the hollow coupling links $b$ are freely supported on the respective tubes $c$, at the same time placing a compressed coil-spring $s$ having an oval cross-section, in position. As thus arranged, the lateral sides of the spring project beyond the corresponding edges of the coupling and into the respective U-shaped cavities of the members $e$, $e^1$, as clearly shown in Fig. 6. The said projecting part of the spring, in coöperation with the main side members or sections of the links A serve to maintain the couplings in position longitudinally of the bracelet. At the same time, too, one end of the spring bears against a tube $c$ of the link, its opposite end being resisted by the corresponding inner end of the coupling. The arrangement of parts being such that the normal expansion of the spring operates, within fixed limits, to automatically contract or shorten the bracelet. The completion of each link A is effected by inserting the fixed pins $p$ of the side section $e$ endwise into the respective tubes $c$, of the opposite section $e^x$, and securing the sections together against lateral separation by indenting the wall of the tube into the notched portion $n$ of the pin. The outer end portions of the tubes $c$, may be slightly flattened, as indicated at $c^1$, Fig. 5.

I claim:—

1. Improved means for securing a pair of opposed laterally separated elongated side sections or members of a bracelet-link together, said means consisting of one of the side members having a tubular post rigidly fixed to its inner face at the respective ends thereof, a pin fixed to the corresponding ends of the other side member of the link arranged to telescopically connect with said posts, and having the post and pin members arranged to interlock with each other in a solderless manner to prevent lateral separation of the sections.

2. A link consisting of a pair of laterally spaced, inwardly facing, oppositely disposed outer side members or sections, each having a substantially U-shape form cross-sectionally, means located at the respective ends of the link for connecting the sections together, said means including a short tube secured to and extending from the inner side of the corresponding section, a notched pin secured to and extending from the inner side of the other or fellow section, said pin being parallel with the tube and inserted in the latter, and having the walls of the tube bent to interlock with said notched part to prevent lateral separation of the sections.

3. The improved link herein described consisting of a pair of parallel, longitudinally curved elongated, laterally separated, inwardly facing main side sections arranged to receive a coupling link therebetween, the said side sections being connected together at each end by means of an open tubular post fixed to one of said sections, and a pin fixed to the respective ends of the other side section and inserted telescopically in said post, and having said post and pin members in solderless interlocking engagement and forming a blind joint.

In testimony whereof I have affixed my signature in presence of two witnesses.

OZRO F. KEITH.

Witnesses:
   GEO. H. REMINGTON,
   CHARLES C. REMINGTON.